United States Patent
Fernández Gutierrez (10) Patent No.: US 8,127,005 B2
(45) Date of Patent: *Feb. 28, 2012

(54) METHOD FOR LAWFULLY INTERCEPTING COMMUNICATION IP PACKETS EXCHANGED BETWEEN TERMINALS

(75) Inventor: Alvaro Fernández Gutierrez, Barcelona (ES)

(73) Assignee: Media Patents, S.L., Barcelona (ES)

( * ) Notice: Subject to any disclaimer, the term of this patent is extended or adjusted under 35 U.S.C. 154(b) by 0 days.

This patent is subject to a terminal disclaimer.

(21) Appl. No.: 13/045,362

(22) Filed: Mar. 10, 2011

(65) Prior Publication Data
US 2011/0167164 A1 Jul. 7, 2011

Related U.S. Application Data

(63) Continuation of application No. 12/338,799, filed on Dec. 18, 2008, now Pat. No. 7,958,233.

(30) Foreign Application Priority Data

Sep. 26, 2008 (ES) .................................. 200802738

(51) Int. Cl.
  G06F 15/173 (2006.01)
  H04M 15/00 (2006.01)
  G06F 15/16 (2006.01)
  H04W 4/00 (2009.01)
(52) U.S. Cl. ........ 709/224; 709/205; 370/252; 370/338; 379/112.01
(58) Field of Classification Search .................. None
See application file for complete search history.

(56) References Cited

U.S. PATENT DOCUMENTS

| 6,741,595 | B2 | 5/2004 | Maher, III et al. |
| 7,068,598 | B1 | 6/2006 | Bryson |
| 7,283,521 | B1 | 10/2007 | Ryan |
| 2004/0165709 | A1 | 8/2004 | Pence et al. |
| 2004/0202295 | A1* | 10/2004 | Shen et al. ............... 379/112.01 |
| 2004/0219911 | A1 | 11/2004 | Kouuchri et al. |

(Continued)

FOREIGN PATENT DOCUMENTS
EP 1389862 A1 2/2004

OTHER PUBLICATIONS

Lawful Interception (LI); Handover Interface and Service-Specific Details (SSD) for IP delivery; Part 5: Service-specific details for IP Multimedia Services; ETSI TS 102 232-5 ETSI Standards, LIS, Sophia Antipolis Cedex, France, vol. LI, No. V2.3.1, Apr. 1, 2008, XP014041613, ISSN: 0000-0001, p. 6-p. 7, p. 10-p. 15.

(Continued)

*Primary Examiner* — Wen-Tai Lin
(74) *Attorney, Agent, or Firm* — Tim L. Kitchen; Peter B. Scull; Berenbaum Weinshienk PC (57) ABSTRACT

A method for lawfully intercepting communication IP packets exchanged between terminals is provided. The method involves assigning an IP address associated with a telecommunication service provider to, for example, a sending terminal for use as its IP address in communications with a receiving terminal, the telecommunication service provider providing SIP proxy services for establishing communication between the sending and receiving terminals. The communication IP packets are intercepted in such a way that the terminals are unaware of the interception.

18 Claims, 5 Drawing Sheets

U.S. PATENT DOCUMENTS

| | | |
|---|---|---|
| 2004/0255126 A1 | 12/2004 | Reith |
| 2005/0063544 A1 | 3/2005 | Uusitalo et al. |
| 2005/0174937 A1 | 8/2005 | Scoggins et al. |
| 2005/0175156 A1 | 8/2005 | Afshar et al. |
| 2006/0018255 A1 | 1/2006 | Tankhiwale |
| 2006/0059163 A1 | 3/2006 | Frattura et al. |
| 2006/0095766 A1 | 5/2006 | Zhu et al. |
| 2006/0146792 A1 | 7/2006 | Ramachandran et al. |
| 2007/0041558 A1 | 2/2007 | Parayil et al. |
| 2007/0143858 A1 | 6/2007 | Hearty |
| 2007/0183403 A1 | 8/2007 | Somers |
| 2007/0255824 A1 | 11/2007 | Granzer |
| 2007/0297376 A1 | 12/2007 | Gass |
| 2007/0297418 A1 | 12/2007 | Lee |
| 2008/0056243 A1 | 3/2008 | Roy et al. |
| 2008/0095146 A1 | 4/2008 | Granzer |
| 2009/0141883 A1 | 6/2009 | Bastien |
| 2009/0197597 A1* | 8/2009 | Kotecha ........................ 455/433 |
| 2010/0150138 A1 | 6/2010 | Bjorsell et al. |

OTHER PUBLICATIONS

M Handley UCL V Jacobson Packet Design C Perkins University of Glasgow: "SDP: Session Description Protocol; rfc4566.txt" IETF Standard, Internet Engineering Task Force, IETF, CH, Jul. 1, 2006, XP015055003, ISSN: 0000-0003, p. 11.

European Patent Office, Transmittal of International Search Report and the Written Opinion of the International Searching Authority for International Application No. PCT/EP2009/061577, Feb. 8, 2010.

Communications Assistance for Law Enforcement Act of 1994, At the Second Session, One Hundred Third Congress of the United States of America, Pub. L. No. 103-414, 108 Stat. 4279; Amendment to Title 18, United States Code.

* cited by examiner

METHOD FOR LAWFULLY INTERCEPTING COMMUNICATION IP PACKETS EXCHANGED BETWEEN TERMINALS

CROSS-REFERENCE TO RELATED APPLICATIONS

This application is a continuation of U.S. patent application Ser. No. 12/338,799, filed on Dec. 18, 2008, now U.S. Pat. No. 7,958,233, which claimed priority to Spanish Patent Application No. P200802738, filed Sep. 26, 2008.

FIELD OF THE INVENTION

The invention is found in the field of the legal communications interception technology and relates to a method of legal multimedia communications interception between two terminals which communicate by means of IP packets wherein said multimedia communication is established by using the Session Initiation Protocol (SIP). The invention also relates to equipment in a Network System which performs said method.

BACKGROUND

An obligation of allowing local authorities to access information exchanged between terminals of networks owned by telecommunication service providers exists in many countries. Implementing a lawful interception system or a communications interception system may be a requirement for being able to work as a telecommunications service provider in said countries. This obligation of allowing the interception of communications is also applied to the communications by means of the IP protocol.

For example, in the United States of America, the "Communications Assistance for Law Enforcement Act", from now on CALEA, requires the telecommunications networks and the telecommunications service providers to have means which enable the legal interception of communications.

In December 1997, the "Telecom Industry Association" (TIA) developed the J-STD-025 standard which helps the telecommunications service providers to carry out the obligations established by CALEA.

Section 229, part a), of CALEA states that the Federal Communication Commission may establish the necessary rules for the telecommunications service providers to implement the obligations stated by CALEA.

In August 1999 the Federal Communication Commission (FCC) published a rule which required the telecommunications service providers to allow the interception of communications which use commuted packets technology, like, for example, the IP protocol used in the Internet. The FCC established September 2001 as the limit date for the telecommunications service providers to implement the systems to allow the interception of communications in the commuted packet networks.

In 1994, the FCC published a "Notice of Proposed Rulemaking" which establishes that the Voice over Internet Protocol (VoIP) services is subject to the obligations of CALEA.

However, some features of the IP protocol increase the difficulty to implement the legal communications interception systems within commuted packet networks. While in the systems based in commuted circuits, the data of the communications follows a determined path until their destination. In the systems based on commuted packets, like for example IP, each data packet may follow a different path until its final destination.

Another difficulty to intercept communications based on VoIP is the encryption of the data transmitted in the data packets. In recent years the computer security has increased in the Internet protocols published in the Internet Engineering Task Force (IETF).

One of the most used protocols in VoIP communications is the Session Initiation Protocol or SIP. In recent years, the SIP protocol has turned into the most used protocol in applications and devices of VoIP.

The SIP protocol is described in the specifications of RFC3261, J. Rosenberg et. al., June 2002, published online by the Internet Engineering Task Force (IETF) and available at www.ietf.org/rfc/rfc3261.txt.

The SIP protocol is a protocol which administers the session establishment but does not send the communication data. For example, in a VoIP session, the SIP protocol is used for establishing a session between various pieces of equipment, which is commonly known as "signaling", and a different protocol, such as the Real Time Protocol (RTP), is used for transmitting the coded voice between said equipment.

The RTP protocol is described in the specification RFC 3550, H Schulzrine et. Al., July 2003, published online by the IETF and available at www.ietf.org/rfc/rfc3550.txt The SIP protocol found in RFC3261 considers different security protocols for a secure exchange of SIP messages.

A first basic security protocol which may use SIP is the protocol known as "HTTP digest" which enables an authentication of messages and a replay protection.

The HTTP digest protocol is described in RFC2617, J. Franks et. al., June 1999, published online by the IETF and available at www.ietf.org/rfc/rfc2617.txt.

A second security protocol for SIP is the "S/MIME". Its use in SIP is described en section 23 of said RFC3261 specifications.

The S/MIME protocol is described in RFC2633, B. Ramsdell, June 1993, published online by the IETF and available at www.ietf.org/rfc/rfc2633.txt.

A third security protocol for SIP is the "Transport Layer Security" (TLS) protocol. Its use in SIP is described in section 19.1 "SIP and SIPS Uniform Resource Indicators" of RFC3261. Said section states that a URI (Uniform Resource Identifier) of a SIPS type establishes that the resource referred by the URI has to be contacted in a secure way. Therefore, the TLS protocol has to be used between the User Agent Client (UAC) and the domain which the URI belongs to. When inside the URI's domain, a secure means of communication is used depending on the security policy of said domain.

The TLS protocol, standardised by the IETF from the SSL protocol (Secure Sockets Layer) developed by Netscape, uses digital certificates for servers authentication and its use is widespread in the Internet.

Another security protocol whose use is considered in RFC 3261 is the IPsec protocol. Section 26.2.1 "Transport and Network Layer Security" of said RFC shows that the IPsec is usually used in architectures where a plurality of equipment or domains have a trust-based relationship between them, which is not always possible.

IPsec is a plurality of security protocols developed by IETF. The basic architecture of IPsec is described in RFC4301, Security Architectures for the Internet Protocol, S. Kent et. al., December 2005, published online by the IETF and available at www.ietf.org/rfc/rfc4301.txt.

The use of said security protocols in SIP with the different paths which an IP packet may use, make difficult the interception of the communications used by the SIP protocol.

Another factor which makes difficult the legal interception of the communications which use the IP protocol is the continuous evolution of the protocols used by the IP packets, the majority of whom are designed by the IETF.

In the year 2000 there was a debate in the IETF about the convenience of taking into account or not the legal interception of communications when designing communications protocols. The result of said debate was that the IETF decided not to take into account the legal interception of communications. The reasons of said decision are explained in the RFC 2804 specifications "IETF Policy on Wiretapping", Harald Alvestrand, et al., May 2000, published by the IETF and available at www.ietf.org/rfc/rfc2804.txt.

Since the majority of the communication protocols through the Internet are designed by the IETF, this decision implies that almost all the protocols used in Internet are designed without taking into account the legal interception of communications.

A basic requirement of the systems for legal interception of communications is that the interception may not be detected by the people involved in said communications since if they do, they will not exchange important information or may exchange false information for cheating the authorities who are intercepting the communications.

The present invention describes an improved method and system for allowing legal interception of the communications which use the SIP protocol.

SUMMARY OF THE DISCLOSURE

The invention has the final objective of providing an improved system of legal interception of communications which cannot be detected by the users involved in the communication.

According to one aspect, a method for lawfully intercepting communication IP packets exchanged between a first terminal having a first IP address and a second terminal having a second IP address is provided comprising a first equipment in a first data network of a first communications service provider assigning a third IP address corresponding to the first telecommunications service provider to the first terminal for use in a SDP (Session Description Protocol) connection field of SIP (Session Initiation Protocol) messages sent by the first terminal, establishing communication between the first and second terminals by exchanging SIP messages using an SIP proxy service of the first data network, the first equipment and/or a second equipment in the first data network receiving at least some of the communication IP packets sent from the first terminal; and intercepting the communication IP packets in the first data network.

According to another aspect, a method for lawfully intercepting communication IP packets exchanged between a first terminal having a first IP address and a second terminal having a second IP address is provided comprising: a first equipment in a first data network of a first telecommunications service provider assigning a third IP address corresponding to the first telecommunications service provider to the first terminal for use in a SDP (Session Description Protocol) connection field of SIP (Session Initiation Protocol) messages sent by the first terminal, establishing communication between the first and second terminals by exchanging SIP messages using a SIP proxy service of the first data network, the first equipment and/or a second equipment in the first data network receiving at least some of the communication IP packets sent from the first terminal and removing any first IP address data from the communication IP packets before sending the messages to the second terminal; and intercepting the communication IP packets in the first data network, the SIP messages being intercepted without changing the SDP connection field.

According to another aspect, a method for lawfully intercepting a communication between a first terminal having a first IP address and a second terminal is provided comprising: sending from a first data network of a telecommunications service provider a second IP address corresponding to the telecommunications service provider for use as a source address in an inner header of at least some of the communication IP packets sent by the first terminal, establishing communication between the first and second terminals using an SIP (Session Initiation Protocol) proxy service of the first data network, the second terminal located outside the first data network, receiving in the first data network encapsulated communication IP packets sent from the first terminal which contain the inner header and unpacking in the first data network the encapsulated communication IP packets to remove any outer headers that contain the first IP address, intercepting in the first data network at least some of the communication IP packets received from the first terminal without changing the inner header; and sending from the first data network the unpacked data packets containing the inner header to the second terminal.

According to another aspect, the invention relates to a method of legal multimedia communications interception between a first terminal and a second terminal which communicate by means of IP packets wherein said multimedia communication is established by using the Session Initiation Protocol (SIP), a version thereof, or any suitable protocol for establishing a VoIP session between various pieces of equipment, and a first terminal sends messages of the SIP protocol (for example) which include information which states that the IP address which it uses to send and receive the multimedia data of the communication is an external IP address which belongs to a network interface or a network card of an intermediate equipment and the IP packets which the terminals exchange during the multimedia communication go through said intermediate equipment and the IP packets which arrive to said intermediate equipment from said first terminal arrive encapsulated and said intermediate equipment removes the packaging before resending said IP packets to its destination, and the intermediate equipment encapsulates the IP packets which it receives directed to said first terminal and resends said packets encapsulated to said first terminal. The legal interception of the IP packets of the communication between the two terminals is performed when said IP packets arrive to equipment connected to the same data network which the intermediate equipment is connected to.

In one implementation, a method of legal interception of multimedia communications between two terminals which communicate by means of IP packets has been developed, the method comprising: the establishment of a multimedia communication by means of the Session Initiation Protocol (SIP), and; a first terminal sends messages of the SIP protocol which include information which states that the IP address that it is going to use to send and receive the multimedia data of the communication is an external IP address which belongs to a network interface of an intermediate equipment, and; the IP packets which are exchanged by the terminals in the multimedia communication go through said intermediate equipment, and; the IP packets which arrive to said intermediate equipment from said first terminal are encapsulated and said intermediate equipment removes the packaging before resending said IP packets to its destination, and; the intermediate equipment encapsulates the IP packets it receives that are directed to said first terminal and resends said encapsulated packets to said first terminal; and the legal interception of the IP packets from the communication between two terminals is performed when said IP packets arrive to an interceptor equipment connected to the same data network which is connected to the intermediate equipment.

According to one embodiment, the two terminals exchange multimedia data using the RTP protocol.

According to another embodiment, the intermediate equipment includes the functionality of a Home Agent and communicates with said first terminal using a Mobile IP protocol.

According to another embodiment, the communication protocol between the intermediate equipment and said first terminal is the Mobile IPv4 protocol.

According to another embodiment, the communication protocol between the intermediate equipment and said first terminal is the Mobile IPv6 protocol.

According to another aspect of the invention, network equipment which intercepts IP packets in a legal interception of a multimedia communication between two terminals which establish a multimedia communication using the Session Initiation Protocol (SIP) is provided that comprises: a first intermediate network equipment that sends to a first terminal information which contains an IP address that the first terminal uses to send and receive the multimedia data of the communication, the IP address belonging to a network interface of said intermediate equipment, and; the IP packets which are exchanged by the terminals in the multimedia communication go through said intermediate equipment, and; the IP packets which arrive to said intermediate equipment from said first terminal arrive encapsulated and said intermediate equipment removes the packaging before resending said IP packets to their destination, and; the intermediate equipment encapsulates the IP packets which it receives directed to said first terminal and resends said encapsulated packets to said first terminal, and; a second interceptor network equipment connected to the same data network as the first intermediate network equipment that performs the legal interception of the IP packets of the communication between the two terminals.

In one embodiment, the network equipment intercepts the IP packets when the two terminals exchange multimedia data using the RTP protocol.

In another embodiment, said intermediate equipment includes the functionality of a Home Agent and communicates with said first terminal using a Mobile IP protocol.

According to another embodiment, the communication protocol between the intermediate equipment and said first terminal is the Mobile IPv4 protocol.

According to another embodiment, the communication protocol between the intermediate equipment and said first terminal is the Mobile IPv6 protocol.

Preferably, said interceptor network equipment which performs the interception of the packets also includes said intermediate equipment.

BRIEF DESCRIPTION OF THE DRAWINGS

Other advantages and features of the invention are found from the following description where, without limiting in character, a plurality of preferred embodiments of the invention are described by means of the following drawings, wherein.

DETAILED DESCRIPTION

The present invention provides an improved system of interception of communications which uses the Session Initiation Protocol which cannot be detected by the users involved in said communication.

SIP messages also use another protocol called "Session Description Protocol" or SDP. The SDP protocol is described in RFC2327, M. Handley et. al., April 1998, published online by the IETF and available at www.ietf.org/rfc/rfc2327.txt.

The SIP and SDP protocols as discussed herein are considered to be the currently standardized protocols and any current or future modifications or equivalents thereof.

Figure 1:
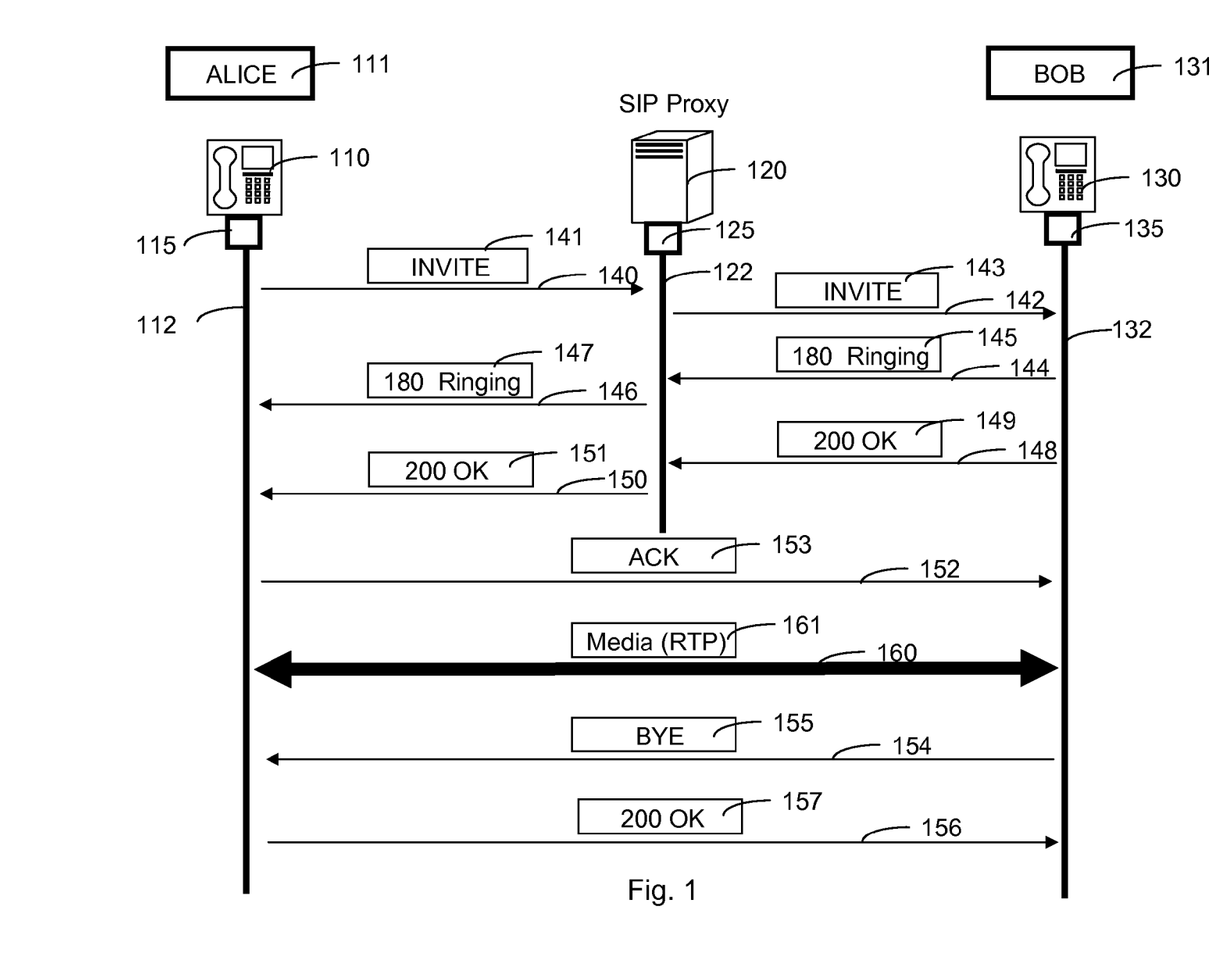
FIG. 1 shows a basic example of establishment of a SIP session using a SIP PROXY type server.

FIG. 1 shows a basic example of an establishment of an SIP session between two terminals 110 and 130 for communications VoIP through a SIP Proxy.

FIG. 1 shows two telephones or SIP terminals 110 and 130 which correspond to two fictitious users known as Alice (111) and Bob (131). Said terminals 110 and 130 include the functionalities of the entities which the SIP protocol denominates "User Agent Client" and "User Agent Server". Because of this, in the SIP protocol, the terminals used by the users are known as "User Agents".

In a lot of bibliography about cryptography it is usual to use fictitious characters such as Alice, Bob and Eve to describe security systems and its vulnerabilities. Normally, Alice and Bob establish a communication and Eve (shortening of eavesdrop which means "to listen secretly") is a fictitious character which tries to intercept the communication.

Said terminals 110 and 130 comprise network interfaces represented by the elements 115 and 135 respectively. The SIP proxy server 120 comprises a network interface represented by element 125.

Said terminals 110 and 130 with the SIP Proxy 120 exchange messages using SIP and RTP protocols. Said messages are encapsulated in IP packets.

Bold lines 112, 122 and 132 from FIG. 1 show the origin and destination of each message and help to show the temporal order of the exchanged messages, which is in the descendant order represented by said lines.

The messages used by the SIP protocol are showed by arrows 140, 142, 144, 146, 148, 150, 152, 154 and 156. The origin and destination of the IP packet which carries the SIP message is shown by the direction of the arrow.

Bold line 160 represents the exchange of multimedia data between the terminals using, for example, the RTP protocol. Said multimedia data may be, for example, a telephone conversation between Alice and Bob.

FIG. 1 illustrates a feature of the SIP protocol which makes difficult the legal interception of the communications. This feature is that the multimedia data of the communication, represented in FIG. 1 by bold line 160 which uses the RTP (Real Time Protocol), is transmitted directly between terminal 110 from Alice and terminal 130 from Bob. This way the IP packets which pack the multimedia data using RTP do not go through the SIP Proxy 120.

In the following the establishment of the SIP session from FIG. 1 is described with more detail.

Alice knows the IP address of the SIP Proxy server 120 which Bob uses for establishing SIP sessions and sends 140 from its SIP terminal an SIP INVITE-type message 141 to the SIP Proxy 120. Said SIP Proxy resends using the communication 142 the INVITE message 143 to Bob's SIP terminal 130.

Said SIP message 141, 143 which is an INVITE-type message, includes a unique identifier of the SIP session using a field or a SIP header known as "Call-ID". It also includes information about the means which Alice wants to use for establishing the SIP session with Bob. For describing said means, the SIP protocol uses a second protocol known as "Session Description Protocol" (SDP).

With said information which the SIP INVITE-type message transmits using the SDP protocol there is the IP address of the network interface 115 of Alice's terminal 110 from which is going to be sent the multimedia data, the kind of protocol to be used for sending the multimedia data, for example RTP, and the port to be used in said multimedia data transmission.

When Bob's terminal 130 receives the INVITE message 143, it replies sending using the communication 144 a SIP message which is a "180 Ringing" type message 145 to the SIP Proxy 120 so the "180 Ringing" message 147 will be resent using the communication 146 to Alice's terminal 110. Simultaneously Bob's terminal 130 beeps with a sound or some kind of signal to indicate to Bob that a call is arriving.

When Bob accepts the call from Alice, for example by picking up the earphone of the terminal 130, Bob's terminal 130 sends using the communication 148 a SIP message 149 which is a "200 OK" type of message to the SIP Proxy 120. The SIP Proxy 120 resends the "200 OK" message 151 to Alice's terminal This "200 OK" message includes information, also described by means of the SDP protocol, about the means which Bob wants to use for sending the multimedia data, including the IP address and the port which terminal 130 is going to use for sending the multimedia data and the kind of protocol for sending the data, which may be, for example, the RTP protocol.

The last step for establishing the SIP session is that terminal 130 from Alice sends using the communication 152 an "ACK" type SIP message 153 to confirm that Bob has received the answer. This message 153 is encapsulated in an IP packet which is sent directly from Alice's terminal to Bob's terminal without going through the SIP Proxy 120. For doing so, Alice uses the IP address which Bob indicated through the SDP protocol in a "200 OK" message 149.

At this point in time the SIP session is already established and terminals 110 and 130 may exchange multimedia data 161 using a protocol such as RTP, previously described. Said multimedia communication, represented in the figure by bold line 160, is performed directly between Alice's terminal 110 and Bob's terminal 130 without going through the SIP Proxy 120.

The SIP messages which are a "BYE" 155 and "200 OK" 157 type are used for closing the SIP session.

Figure 2:
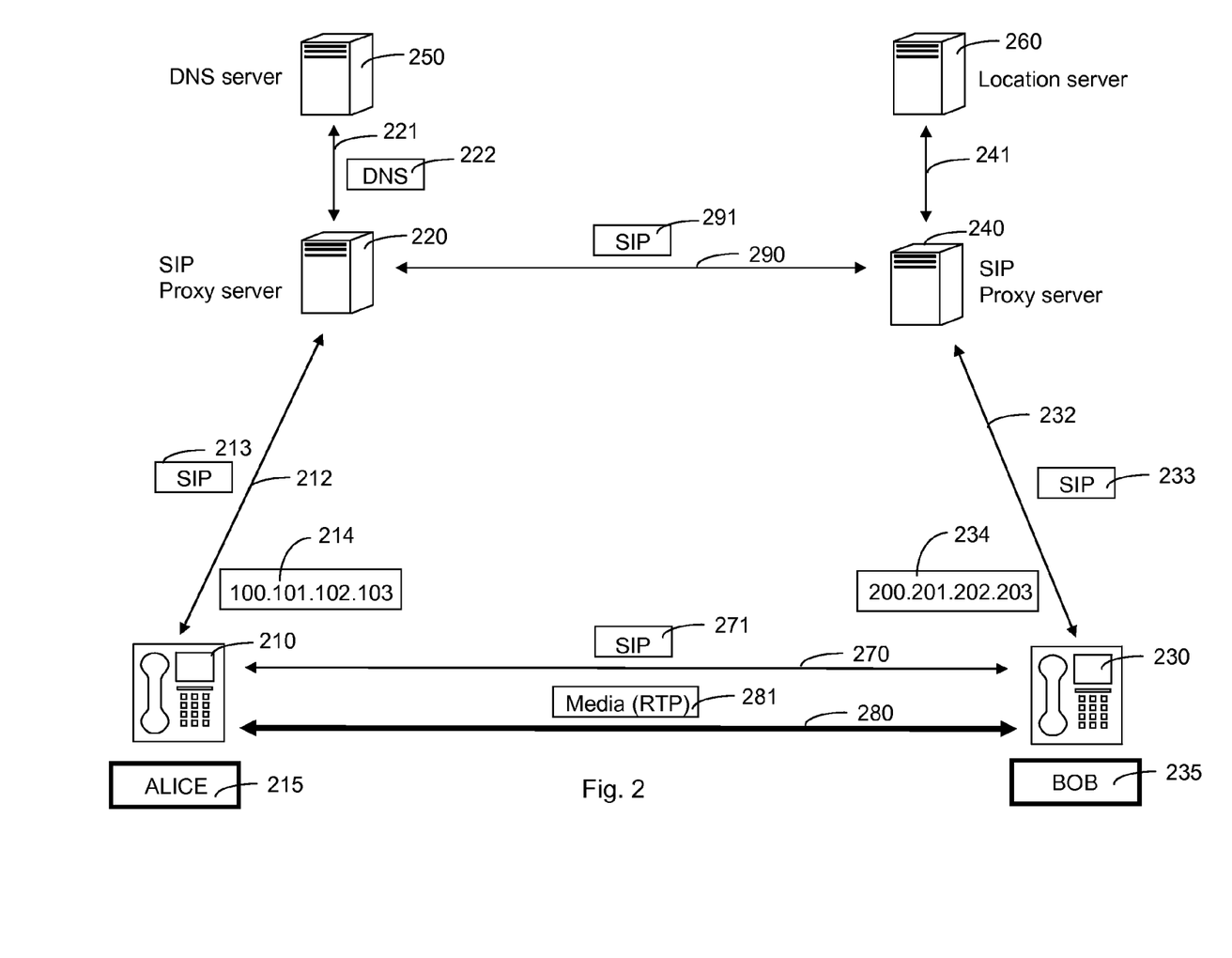
FIG. 2 shows a typical configuration between two SIP Proxies known generally as "SIP trapezoid".

FIG. 2 shows a very common network topology known as "SIP trapezoid". In this topology, two SIP terminals 210 and 230 from different domains establish an SIP session using two SIP Proxy servers 220 and 240, each one in a domain.

The term "SIP trapezoid" is used because of the trapezoid formed by lines 270, 212, 290 and 232 which represent communications using the SIP protocol.

In the configuration of FIG. 2, each SIP terminal 210 and 230 is configured for using a SIP Proxy 220 and 240 respectively, to whom they send the SIP messages for establishing SIP sessions.

For example when Alice's terminal 210 wants to establish a session with Bob's terminal 230, terminal 210 sends a SIP message 213 which is an INVITE type message to Proxy 220 using the communication 212. Afterwards, the steps which the INVITE message follows until reaching terminal 230 which Bob is using are described.

Following the usual denomination used in the RFC specifications from the IETF, we will use the term "header" for referring to the information transmitted using the text lines of the SIP protocol and the term "field" for referring to the information which is transmitted using the text lines of the SDP protocol.

The INVITE message 213 sent by terminal 210 to Proxy 220 includes a plurality of headers and fields whose information is described in the following:

A header known as "To" which includes a URI ("Uniform Resource Identifier") special for the SIP protocol known as SIP URI and which identifies the resource which is the destination of the INVITE message. For example the SIP URI of destination of the INVITE message may be the URI sip: bob@mediapatents.com.

A header known as "From" which includes a SIP URI which identifies the origin resource which sends the SIP message, such as sip:alice@example.com.

A header known as "Call-ID" which is a unique identifier for the SIP session to be established.

A plurality of fields which use the SDP protocol previously described. In the SDP fields is included the information of the IP origin address which terminal 210 is going to use for sending the multimedia data in the communication 280, and the port and type of protocol which is wanted for the multimedia communication, for example, the RTP protocol.

The field SDP used for the IP address which is going to be used by terminal 210 in the multimedia communication 280 is the field known as "connection" which begins with the "c" letter. In FIG. 2, the IP address of Alice's terminal is represented by the element 214 which has the value 100.101.102.103. In this case, the INVITE message sent by Alice will contain the following text line in the SDP protocol: C=IN IP4 100.101.102.103

Where parameter "IN" refers to the Internet network and parameter "IP4" says that the address which follows, 100.101.102.103 is a version 4 IP address.

When the SIP Proxy 220 receives the INVITE message directed to the resource sip:bob@mediapatents.com, it uses the DNS protocol for locating the SIP Proxy Server of the "mediapatents.com" domain which Bob is part of. For doing so, the SIP Proxy 220 communicates with the DNS server 250 using communication 221 using a DNS protocol message known as "query" which is the specific type of "DNS SRV" which uses the DNS protocol for locating resources which provide services, in this case, the SIP Proxy 240 of the "mediapatents.com" domain.

The DNS server 250 answers sending the IP address of the SIP Proxy 240 of the "mediapatents.com" domain which Bob is part of. This exchange of messages in the DNS protocol in the communication 221 is illustrated with the element 222 of FIG. 2.

When the SIP Proxy 220 knows the IP address of the Proxy 240, it transmits the INVITE message 291 to said SIP Proxy 240 using communication 290.

Normally the communication 290 uses one security protocol like for example the TLS protocol or the IPSEC protocols previously described. These security protocols offer different security services like for example, encryption or authentication of the SIP messages interchanged by the two SIP Proxy servers.

When the SIP Proxy 240 receives the INVITE message directed to the resource indicated in the SIP URI "sip:bob@mediapatents.com", the SIP Proxy 240 locates said resource and sends the INVITE message 233. In FIG. 2 the resource sip:bob@mediapatents.com is associated to terminal 230 and the Proxy 240 sends the SIP message 233 which is an INVITE type of message using communication 232 to said terminal 230.

To locate sip:bob@mediapatents.com, the SIP Proxy 240 may use different locating services. The RFC3261 specifications which define the SIP protocol, in it's section "10 Registration" refer to this locating server as an abstract service known as "Location Service" which allows locating users within a domain associating the two types of URI described in the following. The interface between the SIP Proxy and the "Location service" is not defined in the specifications RFC 3261.

The SIP protocol defines two types of SIP URI. A first type is URI associated to users and a second type is the one associated with devices.

The SIP URI associated to users is known as "Address-of-Record" URI (AOR URI). For example, the user Bob may use the URI sip:bob@mediapatents.com and print this URI in his visiting cards. This URI would be the usual way for contacting the user Bob and may be included in the headers "To" and "From" in the SIP messages.

The SIP URI associated with devices, also known as "device URI" or "contact URI", allow directing SIP messages to the device each user uses. For example, in FIG. 2, Bob is using terminal 230 which has the "contact URI" 200.201.202.203 associated, which is the IP address that terminal 230 uses for establishing multimedia communications. Usually the information of the URI associated to a device which is used by a user is included in the "Contact" header of the SIP messages.

Although there are many ways of providing the "Location Service", the SIP protocol defines a special type of server known as "SIP registrar" which relates the "Address-of-Record URI" with one or more "device URI" storing this information in a database.

When a user changes his device he may send a SIP message such as a "REGISTER" type message to the "SIP registrar" server for associating its "AOR URI" with one or more "device URI".

In FIG. 2, when SIP Proxy 240 receives the INVITE message 291 directed to the URI sip:bob@mediapatents.com, the SIP Proxy 240 obtains the "device URI" through communication 241 with the "Location Server" 260 which provides the "Location Server's" service. Said server sends the information that the AOR URI sip:bob@mediapatents.com is associated with the "device URI" 200.201.202.203 and the SIP Proxy 240 retransmits using communication 232 the INVITE message 233 to the IP address of terminal 230 which is the IP address corresponding to said "device URI". This way, the INVITE message 233 arrives to terminal 230 which Bob is using in that moment.

The SIP message flow for establishing the SIP session continues as previously described in FIG. 1 until the establishing of the SIP session and the beginning of the multimedia communication 280 which exchanges multimedia data 281 directly between the IP addresses 100.101.102.103 of terminal 210 and IP 200.201.202.203 of terminal 230.

Like in FIG. 1, the two terminals 210 and 230 can send SIP messages to each other directly, for example "ACK", "BYE" or "200 OK" type SIP messages. These messages are represented by the element 271 of FIG. 2. The element 270 represents a communication directly between the two terminals used when one terminal sends IP packets directly to the IP address of the other terminal.

For performing the legal interception of the communications of FIG. 2, it is necessary to intercept the communication 280 which sends the data, for example, a telephone conversation. For intercepting said communication 280, it is useful to intercept the SIP messages used for establishing said communication since inside said SIP messages it is found the necessary information for performing the interception, such as for example the IP addresses of both ends of the communication 280, the ports used in each end, the transport protocol (normally RTP) and the type of audio or video codification.

Figure 3:
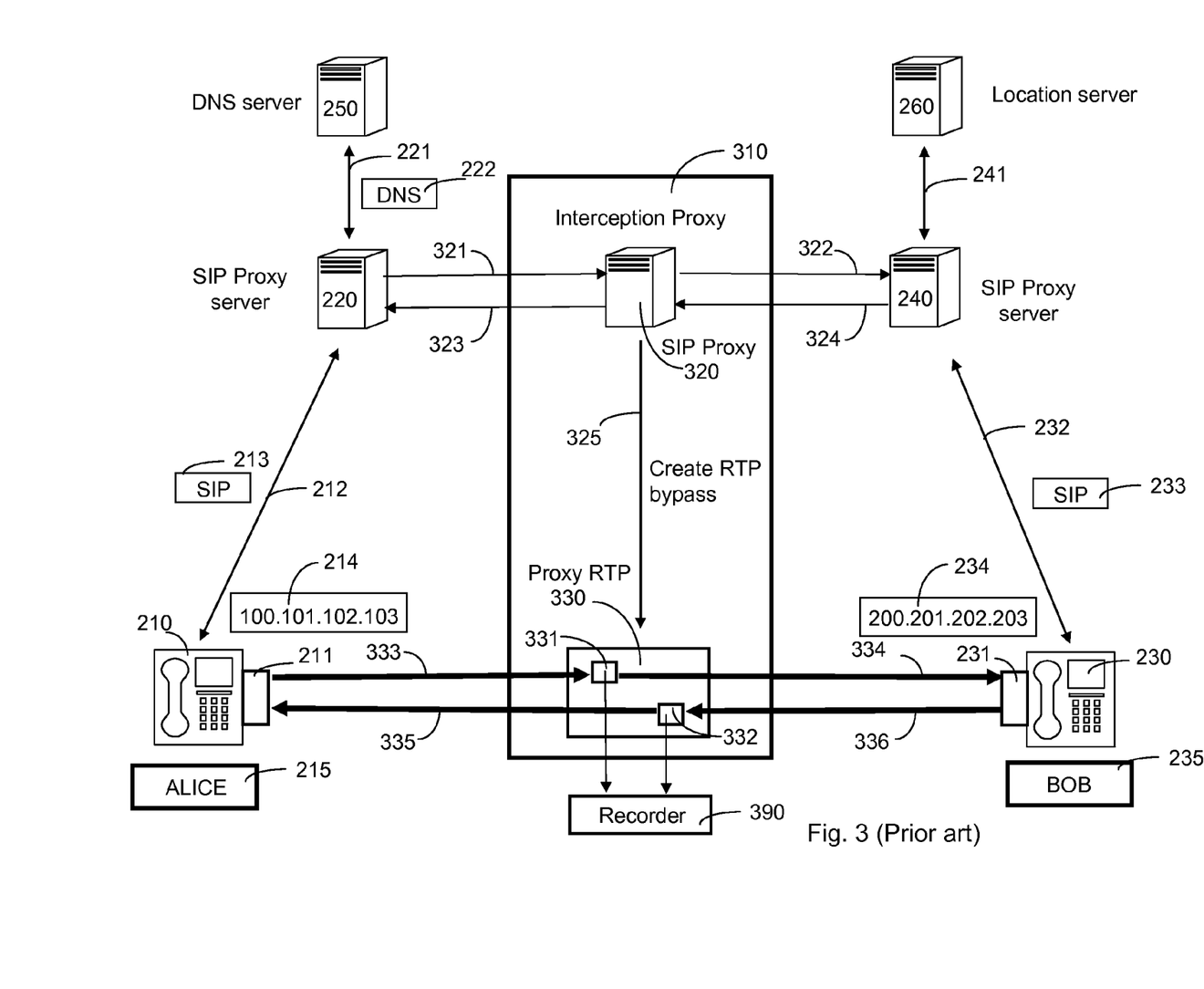
FIG. 3 shows an example of an interception system for SIP communications of the prior art.

FIG. 3 shows an example of the prior art which allows performing said legal interception of the communication. The method used in FIG. 3 is described in United States Patent Application published as US2004/0202295, "Lawful Interception for VoIP calls in IP based networks", Yuzhong Shen, et al. July 2003, available at the USPTO website.

The method described in said patent application consists of an interceptor device 310 which includes a SIP Proxy 320 and a RTP Proxy 330.

For intercepting the communications. The SIP Proxy 320 modifies the SIP messages which are exchanged between terminals 210 and 230 changing the IP origin and destination addresses in such a way that the IP packets which contain the data of the multimedia communication go through the device known as RTP Proxy, from where they may be copied to the device known as "Recorder" 390.

The SIP Proxy 320 receives the SIP messages from SIP Proxy 220 using the communication 321 and transmits the modified SIP messages to the SIP Proxy 240 using the communication 322.

In the same way, the SIP Proxy 320 receives SIP messages from the SIP Proxy 240 using the communication 324 and retransmits the modified SIP messages to the SIP Proxy 220 using the communication 323.

In doing so, the SIP Proxy 320 of FIG. 3 modifies the content of the SDP fields included in the SIP messages that Alice and Bob exchange. More precisely the SIP Proxy 320 modifies the following fields:

The SDP field known as "connection" which includes the origin IP address which each terminal 210 and 230 is going to use for sending and receiving IP packets with multimedia data. Said field is the SDP line which begins with the indicator "c=".

The SDP field known as "media" which indicates the port which each terminal is going to use for sending the multimedia data, normally using the UDP protocol ("User Datagram Protocol"). Said field is the SDP line which begins with the indicator "m=".

Said fields "connection" and "media" are transmitted in the SIP messages which are the "INVITE" and "200 OK" type messages used for establishing the SIP session.

We will call IP1 and IP2 the IP addresses used by Alice and Bob respectively for transmitting and receiving IP packets with multimedia data using the RTP protocol, which we will call RTP packets. In FIG. 3 IP1 is 100.101.102.103 and IP2 is 200.201.202.203.

In a communication with no interception with the communication 280 of FIG. 2, the RTP packets are exchanged directly between the IP1 and IP2 addresses.

By means of the invention of FIG. 3, the SIP Proxy 320 modifies the SDP fields of the SIP messages to indicate to Bob that the origin IP address of Alice is IP4 and to indicate to Alice that the origin IP address from Bob is IP3.

Addresses IP3 and IP4 are IP addresses of the network interfaces 331 and 332 respectively from the RTP Proxy device 330.

This way Alice sends her RTP packets with multimedia data to address IP3 of the network interface or network card 331. This communication is represented by the line 333 in the FIG. 3.

Bob sends his RTP packets with multimedia data to address IP4 of the network interface or network card 332. This communication is represented by the line 336 in the FIG. 3.

In FIG. 3 when the device known as "RTP Proxy" 330 receives the IP packets which carry RTP packets, copies said information transmitting it to a device known as "Recorder" 390 and retransmits the RTP packets to the final destination, being either Bob or Alice using the communications represented by the lines 334 and 335 respectively.

For more clarity, it will now be explained how the interceptor device of FIG. 3 works, using an example.

For example, Alice sends a SIP message 213 which is an INVITE type message to Bob for establishing a SIP session. Said INVITE message contains the SDP field which is a "connection" type field with the IP1 address which Alice is going to use for sending the RTP packets which is 100.101.102.103.

The SIP Proxy 320 receives the INVITE message from Alice, modifies the SDP field known as "connection" so it contains the IP4 address and transmits the INVITE message to the SIP Proxy 240 for it to retransmit it to terminal 230 which Bob is using. This way, when terminal 230 receives the INVITE message 233, the SDP field "connection" contains the IP4 address as if Alice was sending the RTP packets from the IP4 address.

When Bob picks up the earphone of his terminal 230, said terminal sends a SIP message 233 which is a "200 OK" type message which includes the IP2 address which Bob is going to use for sending the RTP packets, which is address 200.201.202.203.

Said "200 OK" SIP message arrives to the SIP Proxy server 320, which modifies the SDP field "connection" for exchanging the IP2 address for the IP3 address, and resends the message to SIP Proxy 220 which resends it to Alice's terminal 210.

This way, Alice's terminal will send its IP packets which contain RTP packets to the IP3 address and Bob's terminal will send its IP packets with RTP to the IP4 address.

The RTP Proxy 330 receives by means of its network interface 331 which uses IP3, the RTP packets which Alice sends to Bob, sends a copy of the information of the RTP packets to the Recorder device 340 and resends the RTP packets to Bob.

Similarly, the RTP Proxy receives through its network interface 332 which uses the IP4 address, the RTP packets which Bob sends to Alice, sends a copy of the content of the RTP packets to the recorder device and resends the RTP packets to Alice.

This system of FIG. 3 has several disadvantages. The first disadvantage is that Alice and Bob can detect easily that the communication is being intercepted which makes useless the interception of the communication since Alice and Bob will not exchange important information if they detect that the communication is being intercepted.

A first easy way of detecting that the communication is being intercepted is by talking. Alice may ask Bob which is his IP address. Since Bob's terminal 230 is not being intercepted, the terminal will show Bob its real IP address which is IP2. Bob says to Alice that his address is IP2 and Alice detects that the RTP packets of the communication with Bob come from an IP3 address different from IP2. This way Alice and Bob detect just by talking that the communication is being intercepted.

Any other system of legal interception of the communications between two terminals which needs to modify the IP packets exchanged by the two terminals, like the system of FIG. 3, may be easily detectable by the users. For example the users may include fields of authentication for detecting if the IP packets have been modified.

The second disadvantage of the system of interception of FIG. 3, is that the system is based in modifying the SDP fields carried by the SIP messages without taking into account that the SIP protocol includes several security features to avoid that the SIP messages are modified in this way.

For example, if the SIP Proxy servers 220 and 240 communicate using the security protocols TLS ("Transport Layer Security") or IPsec previously described, the SIP messages exchanged by said servers will be protected and encrypted and the SIP Proxy 320 will not be able to read them nor modifying them.

A third disadvantage is that the interception device 310 needs to intercept the IP packets which are exchanged by the SIP Proxies 220 and 240. For doing so, it has to be located in the path between the two SIP Proxies when the IP packets that are being sent through a data network can use different paths for arriving to its destination.

The present invention solves these problems using a new interception system of the SIP messages and the RTP messages which does not have to modify the SIP messages and neither the SDP fields which contain the origin and destination IP addresses of the communication between Alice and Bob.

The present invention allows Alice and Bob to exchange the multimedia information using the same origin and destination IP addresses whether the communication is being intercepted or if it is not. By means of the present invention, there is no difference in the IP packets which Alice and Bob exchange because of the interception of the communication. This prevents that Alice and Bob may detect that the communication is being intercepted.

Figure 4:
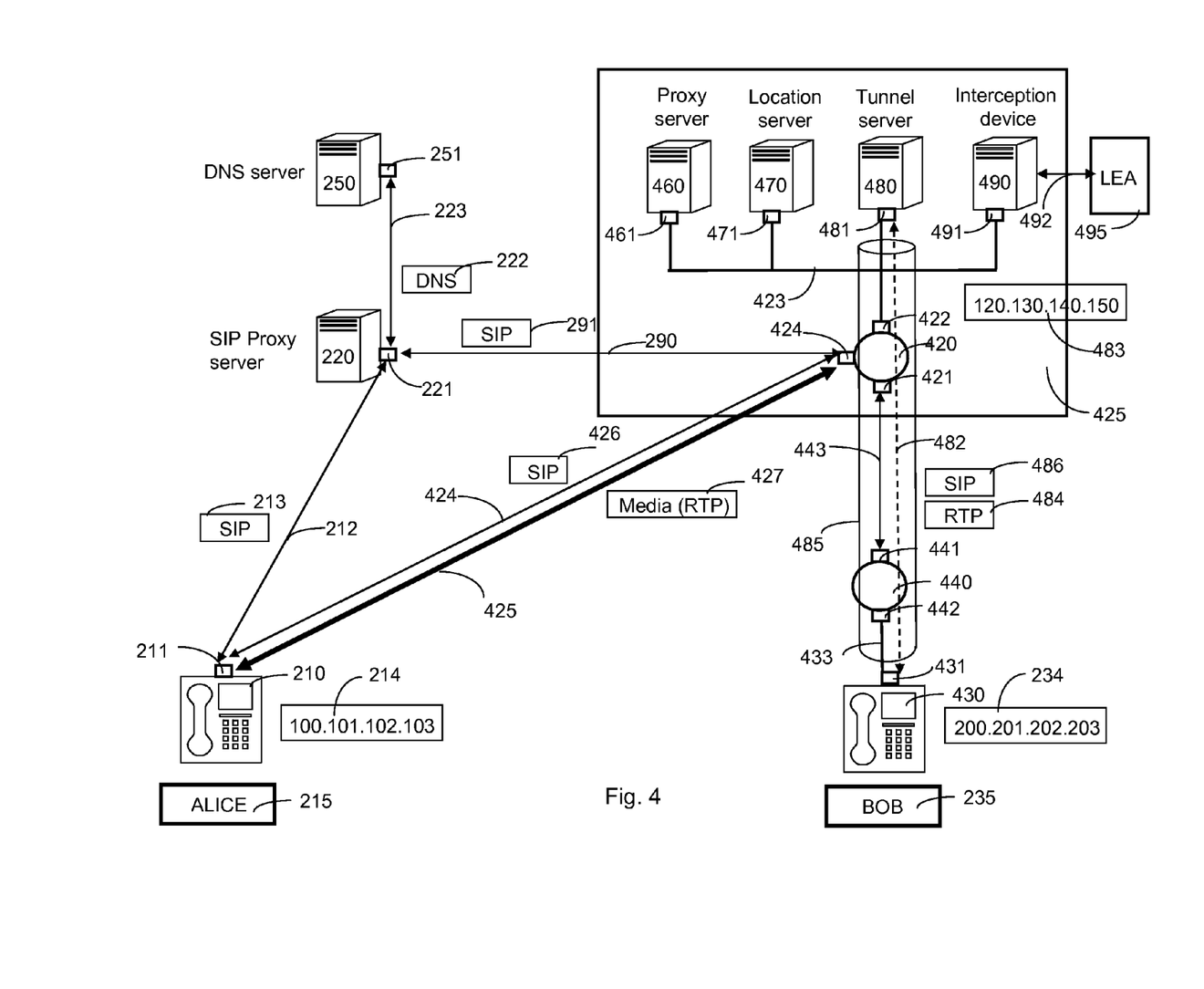
FIG. 4 shows an improved system for legal interception of communications according to an embodiment of the present invention.

FIG. 4 shows an example of an embodiment of the present invention. FIG. 4 shows an intermediate equipment known as "Tunnel server" 480 located in a data network 423 of a telecommunications service provider 425 (also known as a TSP or "Telecom Service Provider") through which the IP packets exchanged by Alice and Bob go, in a communication which uses the SIP protocol, a version thereof, or any other suitable protocol for establishing VoIP sessions between various pieces of equipment.

In the present invention, one of the users whose communication is to be intercepted, for example Bob, uses in the SDP field known as "connection" of its SIP messages an IP address which is not the IP2 address of its terminal 430 but an IP5 external address corresponding to TSP 425 which provides Bob with the SIP Proxy service.

The IP5 address that the TSP 425 assigns to Bob's terminal 430 could be a fixed IP address that remains constant or a could be a changing IP address that changes every time Bob starts using the services offered by the Telecom Service Provider 425 or TSP 425.

Also a same IP5 address could be assigned to different users of the TSP 425 by assigning different ports to each user.

The TSP 425 may obtain Bob's SIP URI and IP2 information and transmit IP5 and port information to terminal 430 in different ways. In one way, for example, the Tunnel server 480 may have a web page where Bob can introduce his SIP URI and IP2 address and obtain an IP5 address and port assigned by the tunnel server 480.

This way the TSP 425 receives the RTP traffic 427 from Alice by means of said IP5 address and resends the RTP traffic to Bob's terminal 430.

FIG. 4 shows this performance. Bob's terminal 430 sends SIP messages to Alice's terminal 210 which does not include its own IP2 but a different address IP5 corresponding to TSP 425.

TSP 425 has several servers 460, 470, 480, and 490, each one preferably having at least one network interface 461, 471, 481, 491 respectively connected each other by means of a data network 423, for example Ethernet, which is also connected to the network interface 422 of the router 420 which allows the TSP equipments to send and receive IP packets to and from external networks, for example Internet.

Router 420 receives by means of its network interface 424 the IP packets from Alice's terminal 210 and from the SIP Proxy Server 220. Also, the router 420 receives through its network interface 421 the IP packets from Bob's terminal 430.

In FIG. 4 are also shown the network interfaces 211, 221, 251 and 431 which correspond to Alice's terminal 210, the SIP Proxy Server 220, DNS server 250 and Bob's terminal 430 respectively.

Router 440 gives connection to Bob's terminal 430. The network interface 431 of Bob's terminal 430 is connected to the network interface 442 of the router 440 by means of a network 433, for example Ethernet, which may be a cable network or a wireless network.

The bidirectional arrows 212, 223, 290, 424, 425 and 443 from FIG. 4 represent communications between different equipment. By means of any of these arrows or communications the equipment at the ends of each arrow may exchange IP packets. However, this does not imply that the equipment at the ends of the arrow are directly connected by means of a physical network, for example Ethernet. For example the IP packets sent by the SIP Proxy Server 220 to the router 420 by means of a communication represented by arrow 290 may go through several routers and data networks, like for example Internet, in its path from origin to destination.

But on the other hand, elements 423 and 433 represent data networks, for example Ethernet networks, either by means of cable network, optic fiber, wireless or any other kind of network.

In FIG. 4, router 440 may provide an IP2 address to Bob's terminal 430, which terminal 430 may use for sending and receiving IP packets. However terminal 430 does not send its SIP messages showing its true IP2 address, which is 200.201.202.203.

Instead of using its true IP2 address, terminal 430 obtains at first an IP address from the intermediate equipment known as Tunnel server 480, which we will call IP5 represented in FIG. 4 by element 483 which is 120.130.140.150, and sends its SIP messages as if the IP address from terminal 430 was IP5 instead of IP2.

The IP5 address may be, for example, an IPv4 or IPv6 address of the network card 481 of the Tunnel Server 480 or may be any IP address of the network 423 that allows the Tunnel server 480 to read the IP packets whose destination address is IP5.

For the terminal 430 to be able to send IP packets with SIP messages or RTP messages in which the origin address of the IP packet is IP5, the terminal 430 may encapsulate the IP packets containing SIP messages or RTP packets inside other IP packets which use an IP address topologically correct, in this case IP2 address. For doing such a thing, terminal 430 may use different encapsulating IP protocols.

In the following the encapsulating IP protocols are explained briefly before continuing with the description of FIG. 4.

One of said packing protocols which may be used in the present invention is the "IP Encapsulation within IP" protocol, described in RFC2003, C. Perkins, October 1996, published online by the IETF and available at www.ietf.org/rfc/rfc2003.txt.

Figure 5:
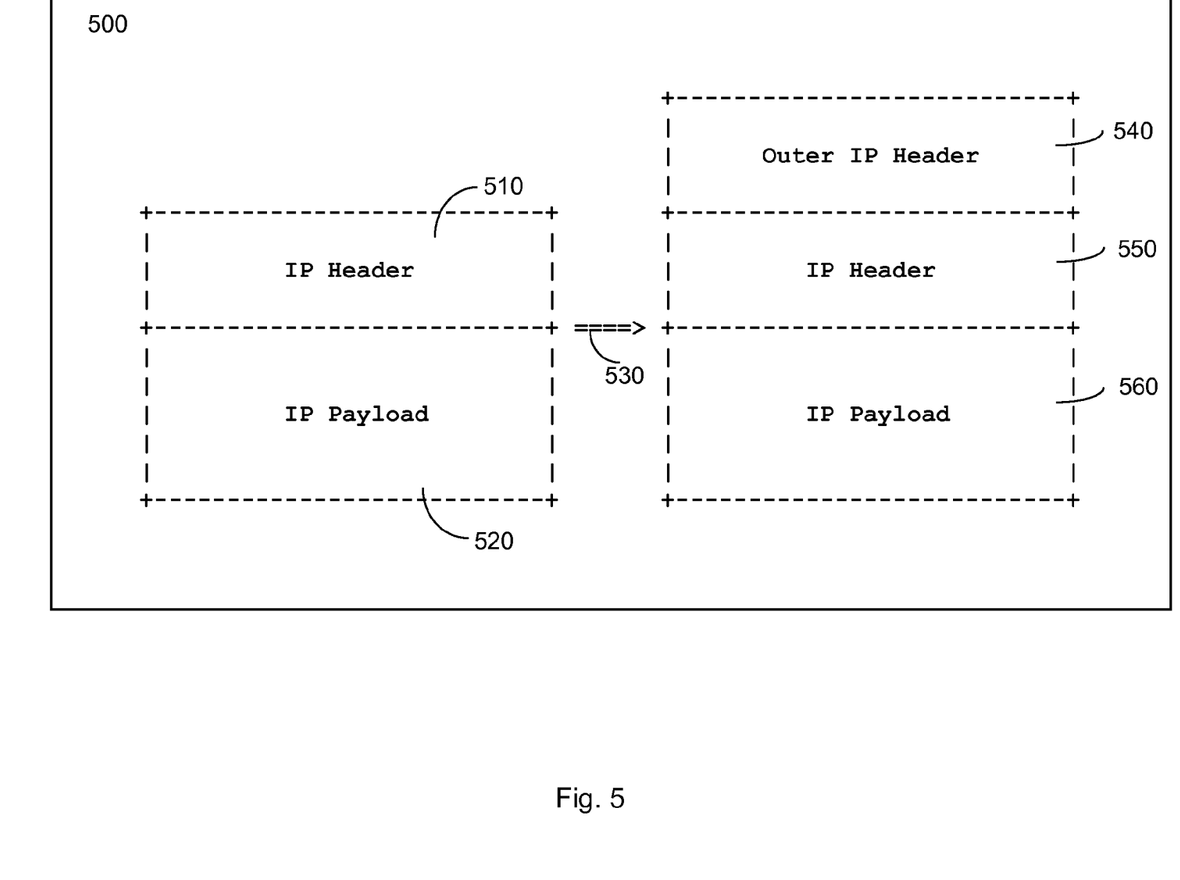
FIG. 5 shows a method of packing known as "IP Encapsulation within IP" for use in alternative embodiments of the present invention.

In FIG. 5, from said RFC2003, it is shown the basic performance of said protocol "IP Encapsulation within IP". A first IP packet made by a header "IP Header" 510 and which carries a plurality of data "IP Payload" 520 is modified 530 for adding a new header known as "Outer IP Header" 540 which will be the header the IP packet uses for reaching its destination. The IP header 550 and the IP Payload 560 will generally contain the same information as the IP header 510 and IP Payload 520 respectively.

The present invention also may use any other encapsulating protocol. For example it may use the "IP Authentication Header" or the "IP Encapsulation Security Payload (ESP)" protocol which are protocols typically used with the plurality of security protocols known as IPsec.

The "IP Authentication Header" protocol is described in RFC4302, S. Kent, December 2005, published online by the IETF and available at www.ietf.org/rfc/rfc4302.txt.

The "IP Encapsulation Security Payload (ESP)" protocol is described in 4303, S. Kent, December 2005, published online by the IETF and available at www.ietf.org/rfc/rfc4303.txt.

Back to FIG. 4, the terminal 430 prepares its SIP messages using the information obtained from TSP 425. For example, it uses the IP5 address obtained from the TSP 425 in its "connection" SDP field of the SIP messages. It also uses the port information obtained from TSP 425 in the "media" SDP field of its SIP messages.

To send the SIP messages, the terminal 430 prepares the IP packets which typically contain the SIP messages and the RTP packets, using as origin IP address the IP5 address, which is 120.130.140.150, assigned by the Tunnel server 480 and as destination IP address, the IP address of the equipment with which it is communicating, for example, IP1 address of Alice's terminal.

Said IP packets may be encapsulated, for example, using the "IP Encapsulation within IP" protocol described in FIG. 5. In this case, a new external header or "Outer IP Header" is added to the IP packet which contains an origin IP address topologically correct for transmitting the IP packet, for example the origin IP2 address which the router 440 may have assigned to the network interface 431 of terminal 430. Said external header may include as a destination IP address an IP address of a network interface 481 of the Tunnel server 480.

This way, terminal 430 creates a tunnel 485 from terminal 430 to the Tunnel server 480. This tunnel allows transmitting the IP packets which contain SIP messages 486 or RTP packets 484 from the network interface 431 from Bob's terminal to the networks interface 481 of the Tunnel Server 480. The discontinuous line 482 shows the directions which the IP packets follow inside the tunnel 485.

The router 440 and the router 420 are connected using the communication 443. The router 440 uses the network interface 441 to send IP packets to router 420. As explained before, by means of the 443 communications the equipment at the ends of the arrow may exchange IP packets. However, this does not imply that the equipment at the ends of the arrow are directly connected by means of a physical network, for example Ethernet. The IP packets sent by the router 440 to the router 420 by means of a communication represented by arrow 443 may go through several routers and data networks, like for example Internet, in its path from origin to destination.

According to one embodiment, when the Tunnel server 480 receives an IP packet through this tunnel 485, it removes the external header of the IP packet and resends to its destination the original IP packet which has as the origin IP address the IP5 address which the Tunnel server has assigned to the terminal 430. This way SIP messages 426 and RTP messages 427 sent from Bob to Alice are sent through router 420 via interface 424 and communications 424 and 425 respectively.

Also, from Alice's point of view, the IP address of Bob's terminal is the IP5 address, since it is the one in the SDP fields included in the SIP messages, and all the messages sent from Alice to Bob will be directed to the IP5 address, in a manner similar to the SIP messages 426 and RTP messages 427.

When the Tunnel server 480 receives an IP packet, for example from Alice's terminal, directed to the destination address IP5 assigned to terminal 430 by Tunnel server 480, the Tunnel Server 480 retransmits it to the IP2 address which is the real address used by said terminal using the same tunnel 485. For doing so it may encapsulate said received IP packet, adding a new outer header which has as a destination IP address the IP2 address of terminal 430 and as the origin an IP address of the network interface 481.

When terminal 430 receives the encapsulated IP packet, it removes the external header and retrieves the original IP packet which Alice's terminal has sent.

This way, preferably all the IP packets which contain SIP messages and RTP packets go through the network interface 481 of the Tunnel server 480 and the Interception device 490 can intercept said IP packets by means of its network interface 491 when the data streams which carry said IP packets go through the data network 423.

The packets can be intercepted in the network of the TSP 425 in different ways. In a first example, the Interception device 490 can "read" or "sniff" all the packets in the network 423 and detect packets that use any information associated with Alice or Bob, like their IP addresses or SIP URIs.

In a second example, the Tunnel server 480 and/or the Proxy server 460 may first receive all or a portion of the packets and resend the packets to the interception device 490.

As explained before, SIP messages may use different security protocols like TLS, IPsec and others.

The media packets 427 also may use security protocols like, for example, the "Secure Real-time Transport Protocol" (SRTP) which can provide confidentiality, message authentication, and replay protection to the RTP traffic and to the control traffic for RTP, the Real-time Transport Control Protocol (RTCP).

The Secure Real-time Transport Protocol (SRTP) is described in the specifications RFC3711, M. Baugher et. al., March 2004, published online by the IETF and available at www.ietf.org/rfc/rfc3711.txt Another security protocol, for example the "Session Description Protocol (SDP) Security Descriptions for Media Streams" may be used to establish the cryptographic parameters for SRTP using a new SDP attributed called, for example, "crypto", which is used to signal and negotiate cryptographic parameters for media streams in general, and for SRTP in particular.

The "Session Description Protocol (SDP) Security Descriptions for Media Streams" is described in the specification RFC 4568, F. Andreasen et. al., July 2006, published online by the IETF and available at www.ietf.org/rfc/rfc4568.txt If a security protocol like TLS, IPsec or SRTP is used for securing SIP messages or RTP packets, then the SIP Proxy 460 sends all the cryptography information, like for example encryption keys, to the interception device 490.

Said Interception Device 490 has a communication 492 with a LEA device 495 which is part of an official organization which has requested the legal interception of the communications. Following the terminology of CALEA, said organization is called "Law Enforcement Agent" or LEA.

The communication 492 between the Interception Device 490 and the LEA device 495 may use several methods for exchanging information. A standard method for this exchange of information is defined by the ANSI/J-STD-025 standard, July 2006, developed by "Telecommunications Industry Association" (TIA) and the "Alliance for Telecommunications Industry Solutions" (ATIS), available at www.atis.org.

This way, the IP packets exchanged between Alice's and Bob's terminals preferably always go through the network interface 481 of the Tunnel server 480 and by using the present invention it is possible to intercept legally the communications between Alice and Bob with no need to modify the SDP fields and other SIP messages which they exchange in such a way that Alice and Bob cannot detect the interception.

The LEA device 495 may send to the interception device 490 information that indicates to the interception device 490 witch communications must be intercepted. For example the LEA device 495 may send to the interception device information comprising the SIP URI used by Alice (sip:alice@example.com) or the SIP URI used by BOB (sip:bob@mediapatents.com) or both of them. According to such an implementation, when the interception device 490 detects a SIP communication established using one of this SIP URI, the communication is intercepted.

Interception may be achieved by the SIP Proxy server 460 sending to the interception device 490 a copy of all the SIP messages received, so the Interception device can check if any of these SIP URIs is used and before starting an interception.

The information sent from the LEA device 495 to the interception device may be a SIP URI, or other identifying information, of a user that is not a user of the TSP 425. For example, Bob may use a first telecom service provider to access the internet, Alice may use a second telecom service provider to access the internet and Bob may uses the SIP proxy services of TSP 425 that is a third telecom service provider different from his own. In this example, the first, the second and the third telecom service providers are different from one another. The LEA device may request an interception by sending the SIP URI used by Alice, sip:alice@example.com to the interception device 490.

In this way, the interception device 490 can intercept the communications of Alice using her SIP URI independently of the internet access that Alice is using to communicate with users of the SIP proxy server like Bob. Alice could be, for example, in a cybercafe, or using a free WIFI hotspot with a laptop or using WIMAX internet connection, but her communications with Bob are able to be intercepted because she uses her SIP URI or other similar identifying information sent from the LEA device 495 to the interception device 490.

Also the present invention offers Bob a very important advantage by allowing him to use an IP5 address which is associated with the Tunnel server 480 for its SIP communications. This advantage is privacy. If Bob sends his IP packets using the IP2 address of his terminal, it is possible for Alice to locate the geographic situation of Bob's terminal by looking for the geographic zone of the IP2 address. This way, offering this privacy service to Bob, it is covered that the present invention allows intercepting legally the communications between Alice and Bob.

In FIG. 4, for more clarity, four different servers 460, 470, 480 and 490 are shown which provide services of Proxy Server, Location Server, Tunnel server and Interception device respectively. However other configurations are equally possible in the present invention. For example, one server may provide the four services or in another example, a first server provides the Proxy Server and Location Server services and a second server provides the services of Tunnel server and Interception device.

In FIG. 4 a single Tunnel server is shown. However the present invention may be used with a plurality of Tunnel servers distributed geographically in such a way that the time needed for an IP packet to be sent from Alice's terminal 210 to Bob's terminal 430 is reduced, using for that the Tunnel Server which allows that the IP packets arrive faster.

In FIG. 4 the Tunnel server 480 has a unique network interface 481. However other configurations are possible and the Tunnel server may have a plurality of network interfaces, each one having several IP addresses.

The present invention has the advantage that it may also be used when the Telecom Service Provider 425 which offers services related with the SIP protocol to the user is a telecommunications service provider different from the one that provides access to the data network, for example Internet, to the user which he wishes to intercept the communication.

Until now, the usual way of intercepting communication through IP packets of a user is intercepting all the IP packet traffic which the user sends and receives. This interception service is provided usually by the TSP which provides the Internet access to the user, from a fixed terminal, for example through ADSL lines or through a mobile terminal, for example a mobile phone with 3G technology for accessing Internet.

However, there are telecommunications service providers that offer services to the users without offering Internet access. For example, the e-mail services known as "Gmail" or "Hotmail" are services which the users may use from any Internet connection and which have a wide acceptance because they are free. For example, Bob may use the e-mails bob@gmail.com or bob@hotmail.com from any computer connected to the Internet. It is possible that these free e-mail service providers offer new services with new communication forms to the users by means of the SIP protocol. For example Bob may use the SIP URI sip:bob@gmail.com for establishing multimedia communications from any computer connected to the Internet. This implies a new difficulty for intercepting these communications since it is not enough to intercept the IP packets of the Internet connections to the Internet which Bob usually uses from home or from his mobile telephone.

The present invention allows performing a legal interception of the communications without the detection from the user, when a telecommunications service provider provides this kind of services related with the SIP protocol to the users in such a way that they may establish multimedia communications from any computer connected to the Internet. For example Bob may use his SIP URI sip:bob@gmail.com from any cybercafe, from the airport with wi-fi connection or from any other Internet connection and, by using the present invention, his communications may be intercepted.

What follows now is a description of a second embodiment. In said second example of the embodiment it is described a method of packing which may be used in an embodiment of the present invention and that gives Bob a new advantage that also covers the possibility that Bob's communications may be legally intercepted. This new advantage is an improved mobility.

In the previous example, terminal 430 obtains an external IP5 address of the Tunnel server 480 and uses it as an origin IP address of the IP packets which contain SIP messages and RTP packets, encapsulating said IP packets in the previously described way. However there are several protocols which allow terminal 430 to perform this packing function with all the IP packets it sends and not only with the IP packets which contain SIP messages and RTP packets. Said protocols are the protocols known as "Mobile IP".

Like all the protocols published by the IETF, the "Mobile IP" protocols were not designed taking into account the legal interception of the communications. However the use of Mobile IP protocols as a encapsulating protocol allows intercepting all the communications from Bob when he uses the SIP protocol in the way described in FIG. 4.

"Mobile IP" is a plurality of protocols defined by the IETF which allow that a mobile device which sends IP packets for communicating may move and use different routers from different data networks while it is moving. The usual term for referring to a mobile device is "Mobile Node" or "MN". The two main protocols of Mobile IP are the protocols known as Mobile IPv4 and Mobile IPv6 which use IP addresses of the IPv4 and IPv6 kind respectively.

The "IP Mobility Support for IPv4" (in the following "Mobile IPv4") is described in the specifications RFC3344 published by the IETF, C. Perkins, August 2002, available at www.ietf.org/rfc/rfc3344.txt. The "IP Mobility Support for IPv6" (in the following "Mobile IPv6") is described in the specifications RFC3775 published by the IETF, D. Johnson et. al., June 2004, available at www.ietf.org/rfc/rfc3775. The functionalities of the Mobile IPv4 and Mobile IPv6 are known to the person skilled in the art. However and for more clarity, a brief description follows.

A "Mobile Node" may have two IP addresses: a permanent address known as "Home Address" and a changing address known as "Care of Address" or "CoA" which is an address associated to the network which the Mobile Node is visiting at that moment.

A device known as "Home Agent" stores the information of the Mobile Node whose IP address is permanently in the same network as the Home Agent. When the Mobile Node is found in its permanent network it does not need to use mobility services.

When a node in the network, usually known as "Correspondent Node" or CN, wishes to send IP packets to a Mobile Node which is found in a remote network it uses the permanent address of the Mobile Node, that is the Home Address, for sending said IP packets. These IP packets are intercepted by the Home Agent which encapsulates said packets adding a new IP header and resends by means of a tunnel to the CoA address of the remote network where the Mobile Node is found.

For packing and sending the packets through the tunnel, the Home Agent and the Mobile Node may use a plurality of protocols such as the "IP Encapsulation within IP" previously described.

In the Mobile IPv4 version a device known as "Foreign Agent" or FA may be used in the remote network which is a router which provides mobility services to the MN. When the Foreign Agent is used, a tunnel between the Home Agent and the Foreign Agent exists.

When a Mobile Node is found outside its permanent network and wishes to send IP packets to a Correspondent Node, the MN can encapsulate said packets directed to the CN and send them first to the Home Agent by means of a tunnel for the Home Agent to resend them to the CN. This method is known as "Reverse Tunneling" and its use in Mobile IPv4 is described in the RFC3024, G. Montenegro, January 2001, available at www.ietf.org/rfc/rfc3024.txt. Its use in Mobile IPv6 is described in section 11.3.1 of the RFC base or RFC3775 previously described.

When the present invention uses the Mobile IP protocol, the Tunnel server 480 of FIG. 4 includes the Home Agent functionality and provides the IP address known as Home Address to the terminal 430 which uses the Mobile IP protocol.

When terminal 430 uses the Mobile IP protocol, it establishes all its communications, including SIP messages and RTP packets, like if its origin IP address was the IP address known as Home Address obtained from the Home Agent.

In FIG. 4, if the protocol used is Mobile IPv4, the router 440 can perform the functions of a Foreign Agent. In this case the tunnel 485 of FIG. 4 would end in router 440, which removes the packaging of the IP packets before sending them to the terminal 430.

In Mobile IPv6 the Foreign Agent function does not exist and the tunnel 485 goes from the Home Agent to the mobile node. In FIG. 4, tunnel 485 would end in terminal 430 which Bob uses.

A problem associated to the mobility is the process when a Mobile Node changes from one router to another. This process of changing the router is known as "handover". When a Mobile Node changes from a first router to a second router it is preferable to perform this change in the fastest way possible for avoiding that the Mobile Node is some seconds unable to send or receive IP packets. It is also convenient to design some mechanism which avoids loosing IP packets which arrive to the first router when the Mobile Node is no longer connected. For example, in a voice application over IP (VoIP) a delay in sending and receiving again packets is not acceptable.

In FIG. 4 a single router 440 is depicted which offers access to a data network, for example Internet, to the terminal 430 used by Bob. However a plurality of routers may exist, for example routers with WIFI and/or WIMAX access, and Bob may move while he communicates with Alice in such a way that his terminal 430 connects to different WIFI and/or WIMAX routers when Bob changes its position.

For solving problems associated with handover, the IETF has published two documents which propose different solutions. These are the documents known as FHMIPv6 HMIPv6 cited below.

The document "Fast Handover for Mobile IPv6" (FH-MIPv6) is described in the RFC4068 specifications published by the IETF, R. Koodli, July 2005, available at www.ietf.org/rfc/rfc4068.txt.

The document "Hierarchical Mobile IPv6 Mobility Management" (HMIPv6) is described in the RFC4140 specifications published by the IETF, H. Soliman et. al., August 2005, available at www.ietf.org/rfc/rfc4140.txt.

The SIP protocol also has mechanisms for providing mobility services like the server known as "SIP registrar". However, these mobility mechanisms of the SIP protocol are not optimized like the Mobile IP protocols and have a longer delay in the handover process.

In the present invention, by using the Mobile IP protocol with the SIP protocol the delay in the handover process can be shortened. This shorter handover process makes using the Mobile IP protocol in Bob's terminal 430 a benefit.

Although the Mobile IP protocols were not designed for allowing the legal interception of the communications, its use in the present invention makes that preferably all packets which terminal 430 sends and receives go through the address IP Home Address of the Tunnel server 480, where they can be intercepted by the Interception device 490 by means of its network interface 491 connected to the same network as the network interface 481 of the Tunnel server which performs the functions of the Home Agent.

Although certain preferred embodiments and examples have been disclosed, it will be understood by those skilled in the art that further implementations or uses beyond those specifically disclosed herein are contemplated. Thus, it is intended that the scope of the present invention herein disclosed should not be limited by the particular disclosed embodiments described above.

What is claimed is:

1. A computer-implemented method for lawfully intercepting communication IP packets exchanged between a first terminal having a first IP address and a second terminal having a second IP address, the method comprising:
   first equipment in a data network of a first telecommunications service provider transmitting a third IP address to the first terminal for use in a SDP (Session Description Protocol) connection field of SIP (Session Initiation Protocol) messages to be transmitted by the first terminal to establish communication between the first terminal and the second terminal,
   the first equipment and/or a second equipment in the data network receiving from the first terminal encapsulated IP packets with an outer header containing the first IP address, a inner header containing the third IP address, and a destination address, the first equipment and/or the second equipment removing the outer header before sending the communication IP packets to the destination address; and
   intercepting the communication IP packets in the data network.

2. A method according to claim 1, wherein the communication IP packets are media packets.

3. A method according to claim 2, wherein the media packets are RTP (Real Time Protocol) packets.

4. A method according to claim 1, wherein the third IP address is associated with the first equipment.

5. A method according to claim 1, wherein the first equipment has a network interface, the third IP address being an IP address of the network interface.

6. A method according to claim 1, wherein the first terminal is a Mobile Node and the first equipment is a Home Agent.

7. A method according to claim 6, wherein the Home Agent communicates with the Mobile Node using Mobile IP version 4, versions or modifications of Mobile IP version 4, or equivalents thereof.

8. A method according to claim 6, wherein the Home Agent communicates with the Mobile Node using Mobile IP version 6, versions or modifications of Mobile IP version 6, or equivalents thereof.

9. A method according to claim 1, wherein the second terminal does not belong to the first telecommunications service provider.

10. A method according to claim 1, wherein the first terminal does not belong to the first telecommunications service provider.

11. A method according to claim 1, wherein the first terminal belongs to a second telecommunications service provider and the second terminal belongs to a third telecommunications service provider, the first, second and third telecommunication service providers being different from one another.

12. A method according to claim 1, wherein the communication IP packets are intercepted by lawful intercepting equipment in the data network which is connected to a law enforcement agency device.

13. A method according to claim 1, wherein the second terminal does not belong to the first telecommunications service provider, the communication IP packets being intercepted by lawful intercepting equipment in the data network which is connected to a law enforcement agency (LEA) device, the intercepting equipment receiving instructions from the LEA device to intercept the communication IP packets in a communication established by using a SIP Uniform Resource Identifier (URI) of a user of the first terminal or the second terminal.

14. A method according to claim 1, further comprising the first equipment and/or the second equipment in the data network receiving SIP messages from the second terminal, at least some of the SIP messages received from the second terminal in IP packets having the third IP address as a destination address.

15. A method according to claim 1, wherein the communication IP packets comprise SIP messages and media packets.

16. A method according to claim 15, wherein the communication IP packets are intercepted in the data network upon the first equipment and/or the second equipment and/or a third equipment in the data network detecting an identifier of a user of the first terminal.

17. A method according to claim 16, wherein the identifier is a URI (Uniform Resource Identifier).

18. A method according to claim 16, wherein the identifier is a SIP URI (Session Initiation Protocol Uniform Resource Identifier).

\* \* \* \* \*